United States Patent [19]

Koved et al.

[11] Patent Number: 5,274,363
[45] Date of Patent: Dec. 28, 1993

[54] INTERACTIVE DISPLAY SYSTEM

[75] Inventors: Lawrence H. Koved, Somers; Edwin J. Selker, New York, both of N.Y.

[73] Assignee: IBM, Armonk, N.Y.

[21] Appl. No.: 648,943

[22] Filed: Feb. 1, 1991

[51] Int. Cl.⁵ ............................................. G09G 3/02
[52] U.S. Cl. .......................................... 345/2; 345/156
[58] Field of Search ............... 340/706, 700, 709, 710, 340/711, 717, 705, 707; 358/194.1; 356/375; 455/603; 434/307; 273/437

[56] References Cited

U.S. PATENT DOCUMENTS

| | | |
|---|---|---|
| 4,451,895 | 5/1984 | Sliwkowski . |
| 4,562,433 | 12/1985 | Biferno . |
| 4,565,999 | 1/1986 | King et al. .................... 340/706 |
| 4,641,255 | 2/1987 | Hohmann . |
| 4,682,159 | 7/1987 | Davison ....................... 340/706 |
| 4,712,105 | 12/1987 | Köhler ........................ 358/194.1 |
| 4,730,186 | 3/1988 | Koga et al. ................... 340/721 |
| 4,734,690 | 3/1988 | Waller . |
| 4,755,883 | 7/1988 | Uehira ......................... 358/194.1 |
| 4,796,019 | 1/1989 | Auerbach ..................... 340/706 |
| 4,895,376 | 1/1990 | Chiang Shiung-Fei ....... 273/313 |
| 4,959,721 | 9/1990 | Micic et al. .................. 340/706 |
| 5,023,438 | 6/1991 | Wakatsuki et al. ........... 340/711 |
| 5,045,843 | 9/1991 | Hansen ........................ 340/706 |

Primary Examiner—Ulysses Weldon
Assistant Examiner—Xiao M. Wu
Attorney, Agent, or Firm—Sughrue, Mion, Zinn, Macpeak & Seas

[57] ABSTRACT

An interactive display system including: a first display; a movable display device having a second display which is substantially smaller than the first display, an input device for inputting information, and a position sensor for providing position information of the movable display device relative to the first display; and a computer, coupled to the first display and the movable display device, for storing image information for the first and second displays. The computer supplies stored image information to the second display in response to the position information provided by the position sensor of the movable display. In another embodiment, the first display is replaced with a model or a physical object, and the computer supplies image information to a display in response to position information provided by the position sensor representing the position of the movable display device relative to the model or physical object.

28 Claims, 8 Drawing Sheets

| RANGE | DIST. | ADDRESS | FILE DATA |
|---|---|---|---|
| (X'min,Y'min) ↔ (X'max,Y'max) | ≤3 | AA | AA |
| (XXmin,YYmin) ↔ (XXmax,YYmax) | ≤3 | B | B |
| (X'min,Y'min) ↔ (X'max,Y'max) | >3 | A | A |

INTERACTIVE DISPLAY SYSTEM

FIELD OF THE INVENTION

The present invention relates to an interactive display system which allows an operator to interact with information displayed on a large projection surface, with various parts of a model, or with a physical object through the use of movable display device.

BACKGROUND OF THE INVENTION

In general, various interactive display and computer display systems are known in the art. The following are examples of such systems.

The article entitled "Absolute Display Window Mouse/Mice", Research Disclosure, March 1987, No. 275, by Feigenblatt discloses flat panel displays which are manually-movable on a large image surface and which serve as a panning display window. The position and orientation of the displays on the large image surface are sensed by digitizers, and this information is used to formulate image information to be shown on the displays. The article discloses that a variety of conventional locating devices, such as sound sensors, may be employed to sense the display position/orientation.

U.S. Pat. No. 4,730,186 to Koga et al discloses several computer display systems, each of which includes an integrated input/output device which incorporates a pen-to-wire grid electromagnetically-coupled digitizer and a flat-panel Liquid Crystal Display (LCD). One display system includes a relatively large cathode ray tube (CRT) display, and a relatively small LCD for the pen-digitizer. In order to store pixel data for the CRT, the computer display system includes a frame memory. The contents of the frame memory for the CRT may be copied to the display of the pen-digitizer. The display system also includes a scrolling and a zooming function.

In order to provide the scrolling and zooming functions, the pen-digitizer input has three coordinate-input areas. Each of these coordinate-input areas is substantially rectangular in shape and is specified in terms of X and Y coordinate values entered by the pen-digitizer. If a pair of coordinates values (X,Y) from the pen-digitizer is within the scroll appointment area, then a coordinate transformation is performed by the computer to normalize the coordinate values to a pair of start-address coordinates $(X_0, Y_0)$, and then the computer transfers the start-address coordinates to a CRT/LCD coordinate transformation controller.

For the zooming function, if the pair of coordinates (X,Y) from the pen-digitizer is within the zooming control section area, a display mode is toggled between a one-half display mode and a normal display mode. In the one-half zooming display mode, every other pixel in the X and Y directions is omitted from the data to be displayed.

U.S. Pat. No. 4,451,895 to Sliwkowski discloses an interactive computer-aided design system which includes two CRT screens: a graphic screen for viewing the end product of a graphic design, and a function screen for entering data. Data may be entered into the computer-aided design system by a light pen interacting with the function screen.

U.S. Pat. No. 4,562,433 to Biferno discloses a display system which includes two displays: a primary LCD and a backup display. The backup display is located behind the primary display relative to the line of sight of a viewer. The primary LCD becomes transparent upon failure in which case the backup display becomes visible to the viewer.

U.S. Pat. No. 4,641,255 to Hohmann discloses a tank or other military-device simulator which displays a computer-synthesized image of a battle situation on a television monitor placed in the field of view of an aiming periscope for viewing by a gunner trainee operating the simulator. A monitor buffer memory, a target memory and a sight memory are provided in a monitor control unit for storing image data for a background-image, target-image and reticle-image components of the computer-synthesized image, respectively. The background-image component of the computer-synthesized image is a "cut-out" portion taken from a larger background image. The background image is selected by signals from control handles in the simulator. The control handles allow a trainee to follow the reticle of a movable target while the cut-out from the background image experiences a continous change.

U.S. Pat. No. 4,734,690 to Waller discloses a graphic display terminal for storing and displaying three-dimensional graphic information. The graphic display terminal permits a user to view the stored three-dimensional graphic information from different directions. The terminal includes a spherical panning system which enables the user to pan around a displayed object so as to view the object from different directions. The user can enter changes in longitude and latitude to permit a new viewing point. The graphic display terminal also includes a zoom feature so that the display can be magnified.

SUMMARY OF THE INVENTION

The present invention provides an interactive display system which includes: a first display; a movable display device including a second display which is substantially smaller than the first display, an input device for inputting information, and a position sensor for sensing the position of the movable display device relative to the first display; and a computer, coupled to the first display and the movable display device, for storing image information for the first and second displays. The computer supplies stored image information to the second display in response to the position sensed by the position sensor of the movable display device, and in response to information inputted by the input device.

In other embodiments of the invention, the first display is replaced with a model or a physical object. In these embodiments, the computer supplies image information to a display in response to position information from the position sensor representing the position of the movable display device relative to the model or the physical object.

DESCRIPTION OF THE PREFERRED EMBODIMENTS

Figure 1:
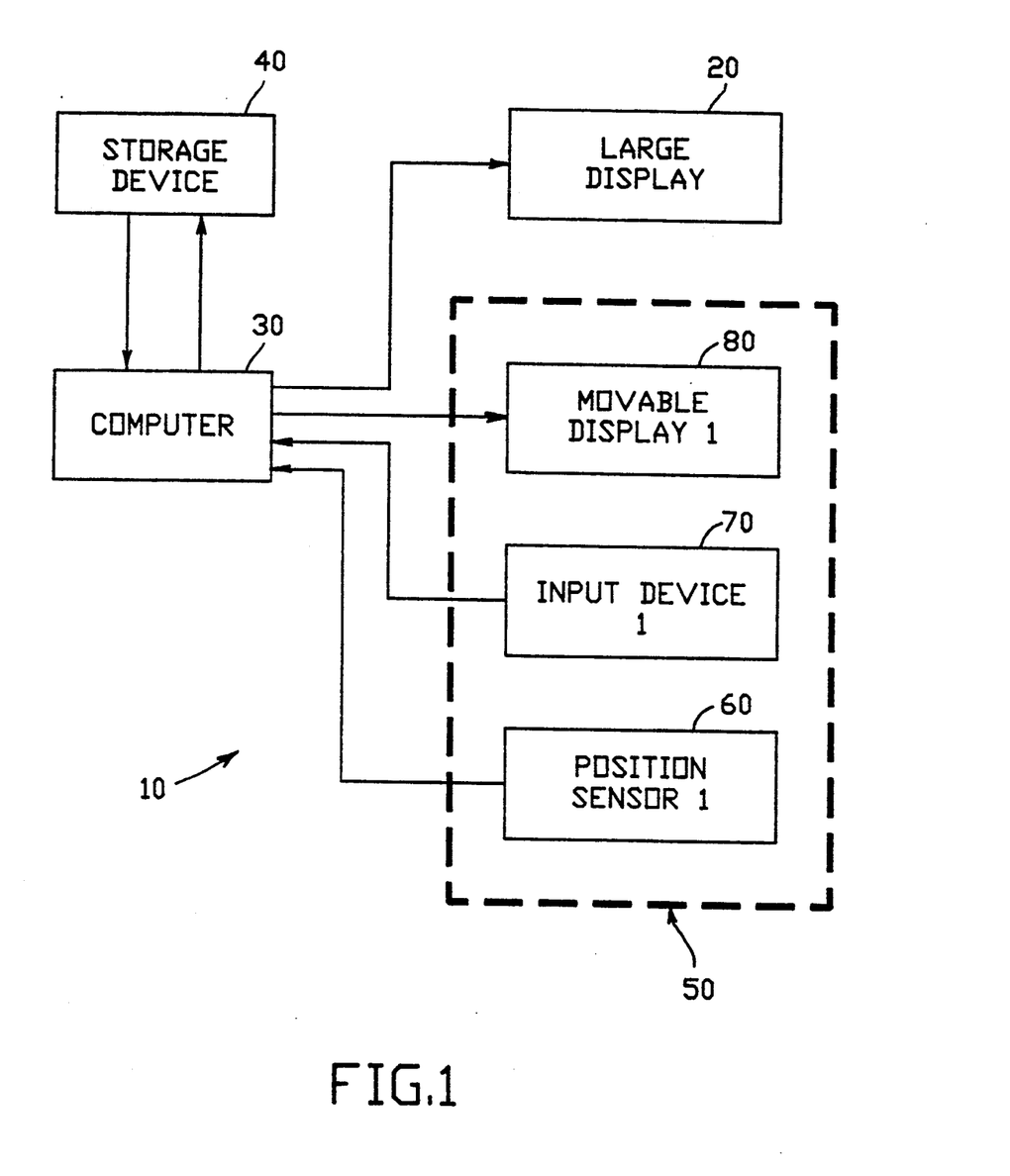
FIG. 1 is a block diagram of the interactive display system according to the invention.

FIG. 1 is a block diagram of the interactive display system 10 according to the invention. The interactive display system 10 includes a relatively large fixed display 20, a computer 30 having an associated storage or memory 40 device, and a movable display device 50. The movable display devices 50 includes a position sensor 60, an input device 70, and a relatively small display 80.

The large display 20, and the small display 80 of the movable display device 50, receive image information stored in the storage device 40 via the computer 30. The computer 30 receives input signals from the input device 70 and the position sensor 60 of the movable display device 50.

The movable display device 50 is a hand-held device. The relatively small display 80 of the movable display device may be constructed from a number of conventional display technologies, such as Liquid Crystal Display (LCD), Electroluminescent Display (EL) or Plasma Display. The input device 70 of the movable display device may be constructed from such input device technologies as alphanumeric keypads, pressure sensitive switches, light pens, and/or voice recognition input devices as is known in the art. The position sensor 60 of the movable display device 50 is a three-dimensional tracking or position device which outputs information representing the position and orientation, i.e., the X, Y, Z, azimuth, elevation and roll, of the movable display device relative to the large fixed display 20. Such a position sensor may be constructed from magnetic, radio, ultrasonic or infrared transducing technologies, as is known in the art. For example, the position sensor 60 may be the commercially-available "3SPACE Isotrak" digitizer and tracker device sold by Polhemus Inc. which utilizes magnetic transducing technology and which provides six-degrees-of-freedom measurements of position and orientation information in formats suitable for display, processing, storage or transmission. Such three-dimensional position sensors are also discussed in "Position and Orientation Tracking System", IEEE *Transactions on Aerospace and Electronic Systems*, AES-15(5): 709-718, IEEE, September 1979.

As will be discussed below, in one embodiment of the invention a number of icons are displayed on the relatively large display 20, and the position sensor 60 of the movable display device 50 serves as a three-dimensional mouse for accessing the icons displayed on the large display 20. Specifically, the position and orientation data provided by the position sensor 60 is supplied to the computer 30 which determines whether the position sensor is pointing or aimed at any one of the icons displayed on the large display 20. If the computer 30 determines that the position sensor is aimed at one of the displayed icons, then image information concerning that icon is supplied to the relatively small display 80 of the movable display device 50.

Figure 2A:
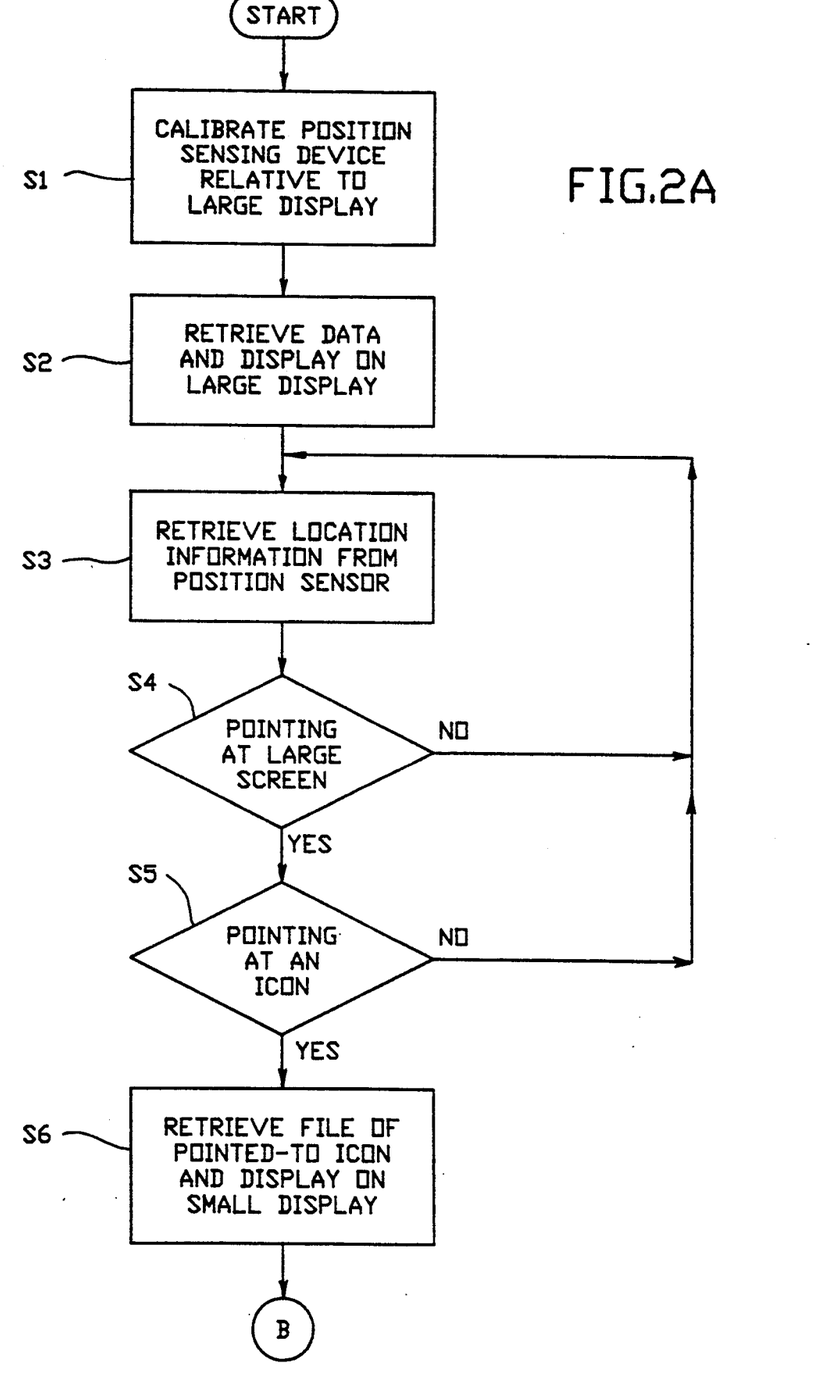
FIGS. 2A-2B are flowcharts showing the operation of the system of FIG. 1.
Figure 2B:
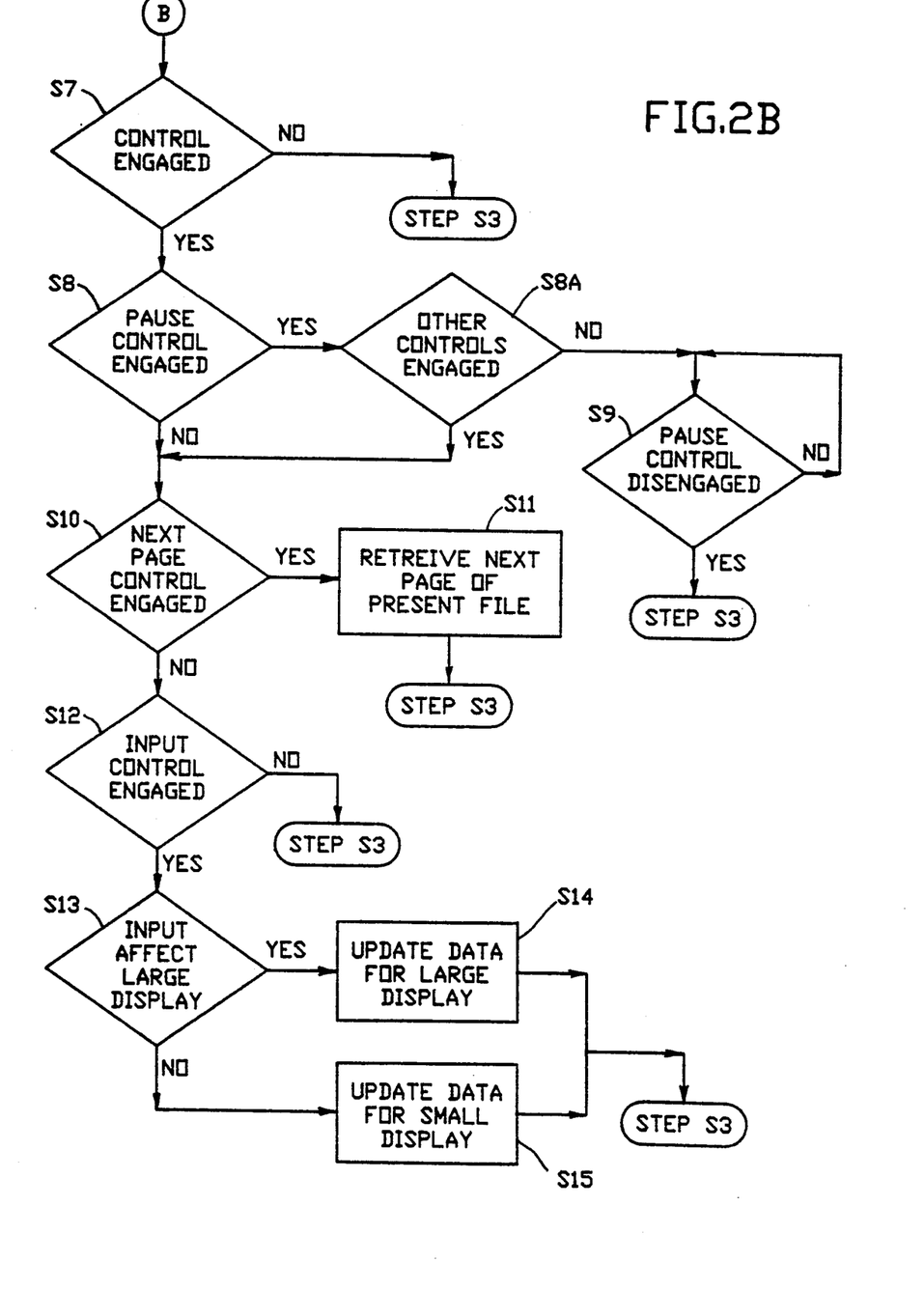

Referring to the flowchart of FIGS. 2A and 2B, the operation of the interactive display system 10 shown in FIG. 1 will now be described.

In step S1, the position sensing device is calibrated relative to the large display 20. For the embodiment discussed above wherein icons displayed on the large display are to be accessed, the general "target" for the position sensor device 60 is the area defined by the large display 20. If the large display 20 is, for example, a rectangle, then the position sensing device 60 would be calibrated such that the four edges of the rectangular large display 20 define the outer limits of the "target".

Figure 3:
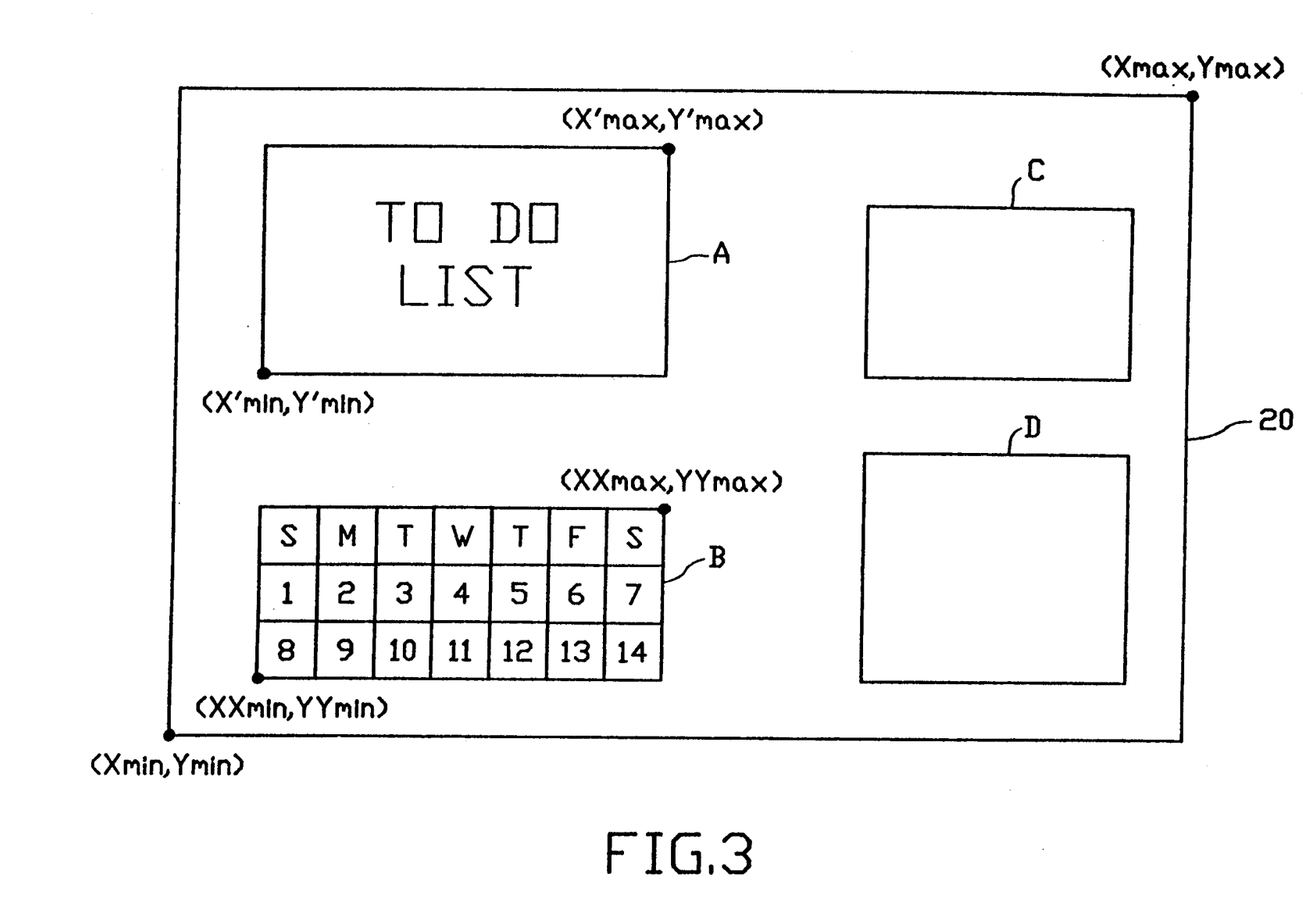
FIG. 3 shows the image data displayed on the large display of the system of FIG. 1 according to a first embodiment of the invention.

After calibration of the position sensor device 60, the process proceeds to step S2 wherein image data stored in storage device 40 is supplied to the large display 20 via the computer 30. As shown in FIG. 3, the image data supplied to the large display 20 represents various icons. In FIG. 3, icon A represents a "TO DO LIST", icon B represents a calendar, and icons C and D correspond to different work files.

Once the image data is displayed on large display 20, the process proceeds to step S3 where location information, i.e., X, Y, Z and the three angles of rotation of the position sensor 50 relative to the large display 20 are retrieved. Based on this location information, it is determined at step S4 whether or not the position sensor 50 is pointing at the large screen 20. This can be done by transforming the three-dimensional location information from the position sensor 50 into a two-dimensional coordinate, and then comparing the transformed two-dimensional coordinate with the area defined by the large screen 20. Specifically, as shown in FIG. 3, the large screen 20 is defined by a range of two-dimensional coordinates between (Xmin, Ymin) and (Xmax, Ymax).

The location information from the position sensor 50 is transformed, for example, by a look-up table stored in storage device 40, into a two-dimensional coordinate which corresponds to where the position sensor 50 is pointing at on the large display 20. The transformed two-dimensional coordinate is then compared by the computer 30 to determine if it falls within the range of coordinates which define the large display 20. A similar transformation scheme utilizing a light-pen digitizer is described in U.S. Pat. No. 4,730,186 to Koga et al.

If it is determined at step S4 that the position sensor 60 is not pointing to the large screen 20, then the process proceeds back to step S3 where location information from the position sensor 60 is again retrieved. On the other hand, if it is determined at step S4 that the position sensor 60 is pointing to the large screen 20, then the process proceeds to step S5. At step S5 it is determined whether or not the position sensor 60 is pointing to one of the icons displayed on the large screen 30. This can be accomplished in a manner similar to the manner it was determined in step S4 as to whether or not the position sensor 60 was pointing to the large display 30. For example, as shown in FIG. 3, icon A representing the "TO DO LIST" is defined between coordinates (X'min, Y'min) and (X'max, Y'max) within the large screen 20, whereas icon B representing the calendar is defined between coordinates (Xxmin, YYmin) and (XXmax, YYmax). Once the location information from the position sensor 60 is transformed into a two-dimensional coordinate corresponding to a point on the large display 20 where the position sensor 60 is pointing to, then computer 30 compares the transformed coordinate with the range of coordinates which define the icons to determine whether or not there is a "match", i.e., whether or not the transformed coordinate falls within one of the ranges of coordinates defining a displayed icon.

If in step S5 there is no "match", i.e., the position sensor is not pointing to any one of the icons displayed on the large screen 20, then the process proceeds back to step S3. On the other hand, if a "match" is found in step S5, i.e., computer 30 determines that the position sensor 60 is pointing to one of the displayed icons, then the process proceeds to step S6.

In stop S6, image data corresponding to the pointed-to icon is retrieved from the storage device 40 and supplied to the small display 80 where the retrieved image data is displayed. This can be accomplished by a look-up table which correlates the range of coordinates defining a particular icon with an address of image data stored in storage device 40.

Figure 4:
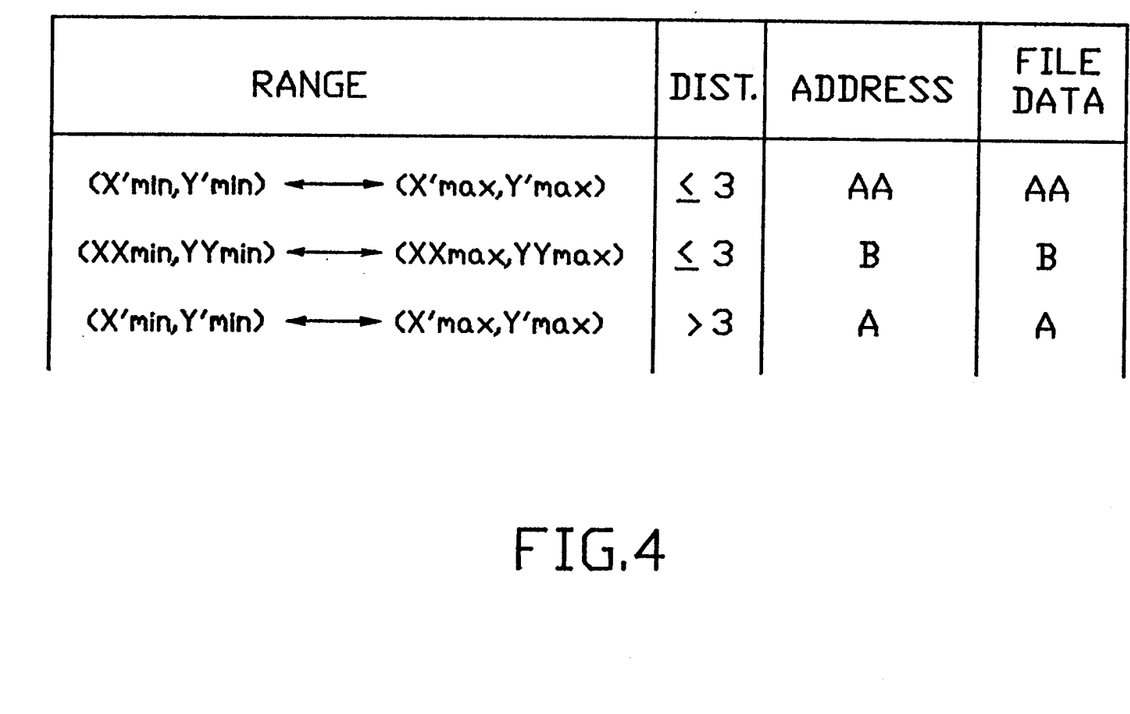
FIG. 4 is a look-up table according to the invention.

As shown in the look-up table of FIG. 4, the range of coordinates defining icon A, i.e., (X'min,Y'min) through (X'max,Y'max), corresponds to an address for image data A, and the range of coordinates defining icon B corresponds to an address for image data B. If, for example, in step S5 it was determined that the position sensor 60 was pointing at icon A, i.e., the transformed coordinates of the position sensor 60 fall within the coordinate range defining icon A, then in step S6 the address of image data A stored in storage device 40 would be retrieved and displayed on the small display 80 of the movable display device 50.

Figure 5:
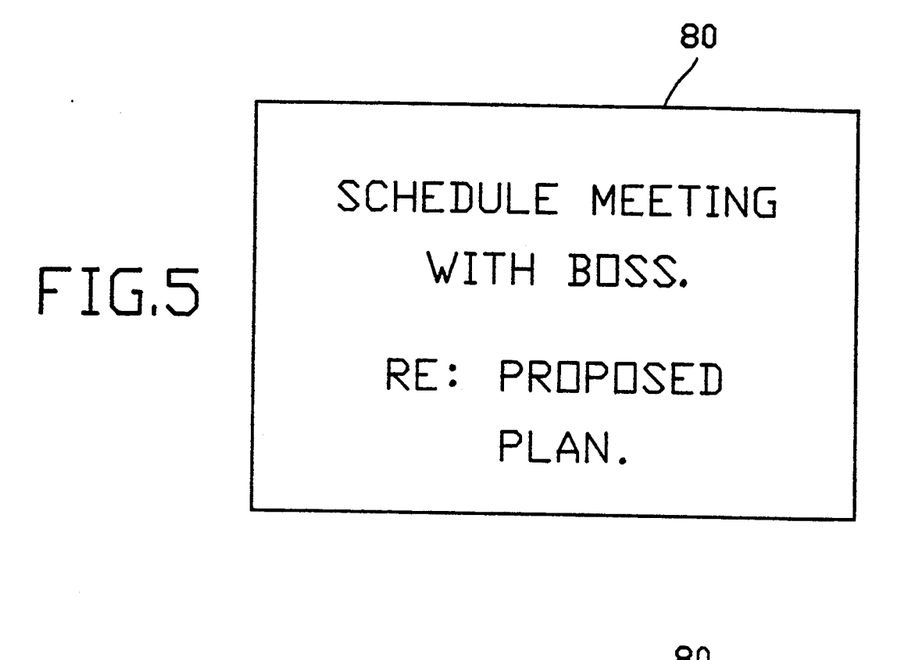
FIG. 5 shows first image data displayed on the small display of the system of FIG. 1 according to the first embodiment.

According to the invention, the stored image data A represents information which has some relation to icon A. FIG. 5 shows the image data A displayed on the small display 80 of the movable display device 50 after it was determined that the position sensor 60 is pointing to the "TO DO LIST" icon A. As shown in FIG. 5, the displayed image data, "SCHEDULE MEETING WITH BOSS RE: PROPOSED PLAN" bears a relation to the "TO DO LIST" icon A.

Referring again to the look-up table of FIG. 4, the range of coordinates defining icon A may correspond to either file A or file AA. However, file A is retrieved when the distance between the position sensor 60 and the large display is greater than three meters, and file AA is retrieved when the distance between position sensor 60 and the large screen is less than three meters.

Figure 6:
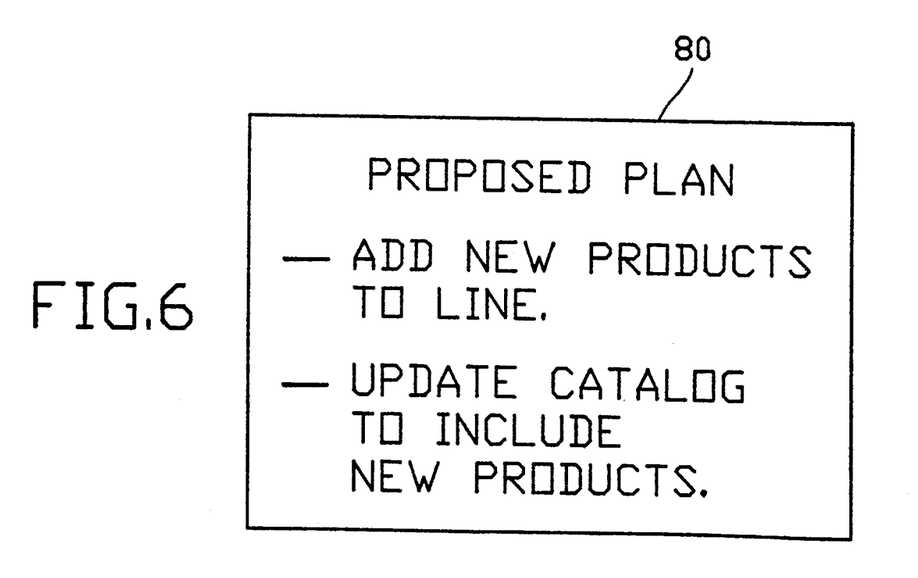
FIG. 6 shows second image data displayed on the small display of the system of FIG. 1 according to the first embodiment.

As shown in FIG. 6, similar to file A, file AA represents image information which is related to the icon A; however, file AA contains image information which is more specific than the image information of file A. Specifically, the image information contained in file A generally indicates that a meeting needs to be scheduled with the boss regarding the proposed plan. FIG. 6 shows the image information of file AA displayed on the small display 80 of the movable display device 50. The image information shown in FIG. 6 represents specific details of the proposed plan indicated in file A, i.e., that new products should be added to the company's line and that the company's catalog should be updated to include the new products.

Thus, in step S6, the location information from the position sensor 60 is used not only to determine which displayed icon is being pointed to, but also to determine the distance between the position sensor and the large screen 20 so that the corresponding file can be retrieved and displayed on the small display 80.

With the arrangement of files described above, an operator can first point the position sensor 60 of the movable display device 50 towards an icon displayed on the large display at a distance greater than three meters in order to retrieve a file containing image information which generally corresponds to the aimed at icon. If after reviewing this general information, the operator desires to obtain more specific information concerning the displayed information, the operator can move the position senor 60 of the movable device 50 closer to the large screen, e.g., within three meters, in order to access a file which contains the more specific information. If the operator subsequently moves the position sensor 60 of the movable display 50 to a position which is greater than three meters from the large screen 80, then the file containing the general information will be again retrieved and displayed on the small display 80.

Once a retrieved file is displayed on the small display 80 at step S6, the process proceeds to step S7 (FIG. 2B) where it is determined whether or not any one of the controls of the input device 70 has been engaged. If it determined in step S7 that none of the input device controls has been engaged, then the process returns to step S3. On the other hand, if in step S7 it is determined that one of the input device controls has been engaged, then the process proceeds to determine which of the input device controls has been engaged.

The process first proceeds to step S8 to determine whether or not the pause control has been engaged. Upon engagement of the pause control, the present display on the small display 80 is maintained regardless of where the position sensor 60 of the movable display device 50 is aimed. Thus, upon engagement of the pause control new location information from the position sensor 60 is ignored. The pause control may be used, for example, if an operator wishes to study the information displayed on the small display 80 of the movable display device 50 without concern as to the position of the movable display device 50 relative to the large screen 20. For example, the operator may engage the pause control and then freely move across the room containing the large display to a position where a chair is situated so that the operator can then sit down in the chair and study the information displayed on the small display.

After the pause control is engaged, the process proceeds to step S8A where it is determined whether or not any other controls have been engaged. If another control has been engaged, then the process proceeds to step S9 until the pause control is disengaged at which time the process proceeds back to step S3.

If it is determined at step S8 that the pause control is not engaged or if in step S8A it is determined that another control has been engaged, then the process proceeds to step S10 where it is determined whether or not the next page control is engaged. The next page control allows the next page of an accessed file to be retrieved. For example, if file AA contains a number of pages of specific information, then the next page control can be utilized to allow an operator to access the different pages of information.

If in step S10 it is determined that the next page control is engaged, then the process proceeds to step S11 where the next page of the present file is retrieved. The process then proceeds back to step S3.

If at step S10 it is determined that the next page control is not engaged, then the process proceeds to step S12 where it is determined whether or not any input controls have been engaged. The input controls allow an operator to amend information in a particular file, or to create new files. For example, the input device 70 may include an alphanumeric keypad in order to amend information contained in a particular file. In addition, as is described in U.S. Pat. No. 4,451,895 to Sliwkowski, the input device 70 may, for example, include a light pen function screen so that formats and icons may be easily and rapidly changed according to the operator's liking. Such a light pen function screen may be used to add new, or remove existing icons of the large screen display 20.

If in step S12 it is determined that none of the input controls has been engaged, then the process proceeds to step 3. If it is determined in step S12 that an input control has been engaged, the process proceeds to step S13 to determine whether or not the inputted information affects the image information of the large display 20, e.g., the addition or removal of an icon would affect the large display 80. If in step S13 it is determined that the inputted information affects the large display 20, then the process proceeds to step S14 where the data base for the image information of the large display 20 is updated and then the process returns to step S3. If in step S13 it is determined that the inputted information does not affect the image information of the large display 20, the process proceeds to step S15 where the data base containing image information for the small display 80 is updated, and then the process proceeds back to step S3.

Figure 7:
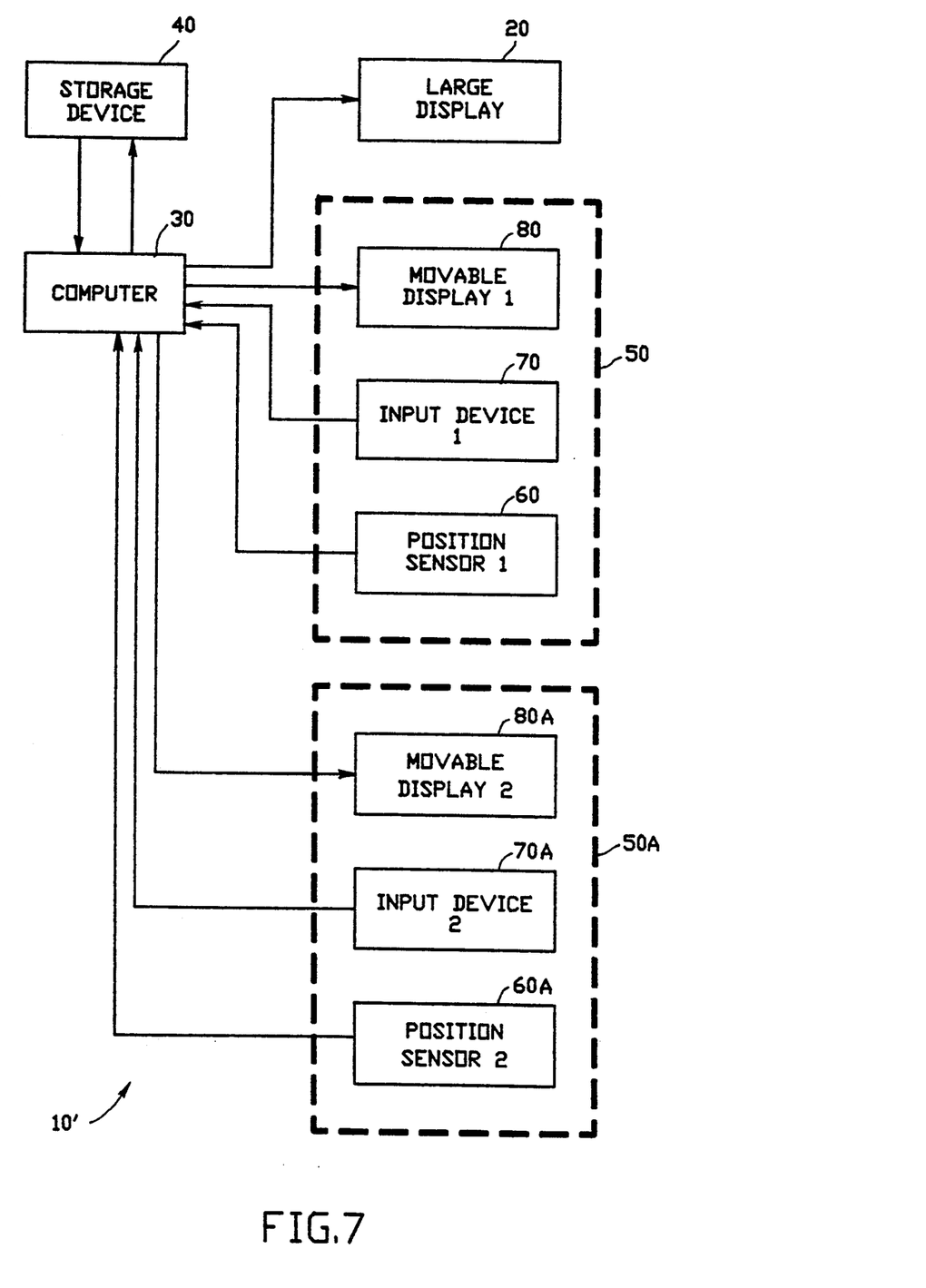
FIG. 7 is a block diagram of the interactive display system according to a second embodiment of the invention.

FIG. 7 shows another embodiment of the invention which is similar to the embodiment shown in FIG. 1, except that this embodiment includes a second movable display device 50A. As shown in FIG. 7, the second movable display device 50A is identical to the first movable display device 50, and contains a position sensor 60A, an input device 70A and a small display 80A. When providing more than one movable display device 50, 50A, greater flexibility is afforded to the interactive display system 10'. For example, if an operator accesses a particular file on the small screen 80, 80A of one of the movable display devices 50, 50A, and desires to maintain this particular file on the small screen for later reference and also desires to access simultaneously another file, then this situation can be accomplished with the interactive display system 10' of FIG. 7 which contains more than one of the movable display devices.

Specifically, this situation may be accomplished by first obtaining the particular file on the small screen 80 of one of the movable display devices 50, placing a second movable display device 50A on top of the first movable display device 50 such that the position sensor 60A of the second movable display device 50A will be positioned relative to the large screen so as to access and display the same file displayed on the small screen 80 of the first movable display device 50. At this point, the pause control of input device 70, 70A of either the first or the second movable display device 50, 50A can be engaged to maintain the accessed and displayed file for later reference, i.e., the movable display device which has its pause control engaged can be positioned anywhere with respect to the large screen 20 and the accessed and displayed file will be maintained on the small display. The movable display device whose pause control was not engaged can then be utilized for accessing a different file.

Figure 8:
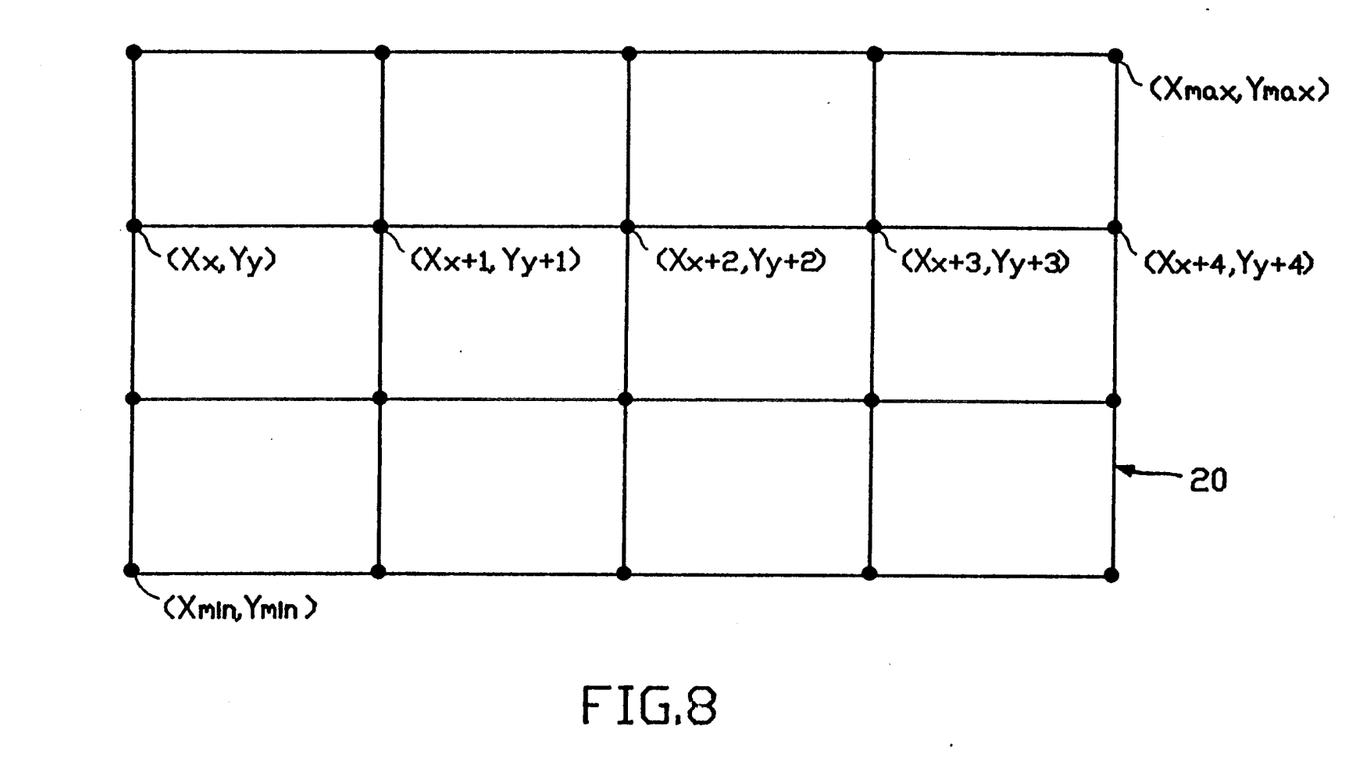
FIG. 8 shows the coordinate layout of the large screen according to a third embodiment of the invention.

The first and second embodiments described above relate to accessing files according to icons displayed at various locations on the large screen. In a third embodiment of the invention, the image information displayed on the large screen is continous and spans the complete area of the large screen, e.g., the displayed image information represents a map. As shown in FIG. 8, in this embodiment, the complete surface of the large display is divided into several matrixes, each of which contains a part of the total image displayed on the large display. When the position sensor 60 of the movable display device 50 is aimed within one of the matrixes of the large display 20, the image information within that aimed-at matrix is displayed on the small display 80. Thus, as the operator pans the movable display device across the surface of the large display 20, images corresponding to parts of the image displayed on the large display 20 will be displayed on the small display 80. In this regard, U.S. Pat. No. 4,641,255 to Hohmann and U.S. Pat. No. 4,730,186 to Koga et al disclose systems wherein a part of an image displayed on a large screen is displayed on a small screen.

The third embodiment of the invention may also includes a zooming function. Zooming functions are well known in the art. For example, the Koga et al patent cited above provides a zooming function which changes the correspondence ratio between the display screen of a CRT display and an integrated flat panel display. In the Koga et al system, the zooming function is enabled by use of a digitizer and a coordinate input pen. According to the third embodiment of the invention, the zooming function is enabled by moving the position sensor 60 of the movable display device within a predetermined distance from the large display 20, e.g., within three meters. That is, as was the case for accessing file AA in the previous embodiments, the computer 30 determines from the output of the position sensor 60 whether or not the movable display device 50 is within a predetermined distance from the large screen 20. If it is determined that the position sensor 60 of the movable display device 50 is within this predetermined distance, then the zooming function for the image presently displayed on the movable display 80 is enabled. The zooming function can be disabled by simply moving the position sensor 60 of the movable display device such that it is positioned a distance from the large screen 20 which is greater than-the predetermined distance.

In a fourth embodiment of the invention, the large screen 20 is replaced with a physical model, e.g., a model of an airplane. In this embodiment the position sensor would be calibrated such that when the position sensor of the movable display device is aimed at various parts of the airplane model, different files are retrieved and displayed on the small screen, respectively. For example, a first file containing information concerning the cockpit of an airplane would be retrieved and displayed on the small display 80 when the position sensor 60 of the movable display device 50 is aimed at the cockpit part of the model airplane. Similarly, another file containing information concerning the wings of an airplane would be retrieved and displayed on the small display 80 when the position sensor 60 of the movable display device 50 is aimed at the wings of the model airplane.

In a fifth embodiment of the invention, the interactive display system of the invention is utilized with actual physical objects. In this regard, various position sensors are available, such as the well known LORAN position sensor, for determining the position or location of an aircraft or boat. According to this embodiment, the location information from such a position sensor is used to address a file containing information concerning the determined location. For example, a look-up table would be provided in the storage device 40 such that if a position sensor mounted in an aircraft provides location information indicating that the aircraft is located above a specific city, then a file containing image information concerning the city would be retrieved from the storage device 40 and displayed on the small display 80 of the movable display device 50.

While preferred embodiments of the invention have been described above, it will be apparent to those skilled in the art that many changes and modifications may be made without departing from the invention in its broader aspects. The appended claims are therefore intended to cover all such changes and modifications as fall within the true spirit and scope of the invention.

What is claimed is:

1. An interactive display system comprising:
   a first display means;
   a movable display means comprising a second display means which is substantially smaller than said first display means, input means for inputting information, and a position sensor for providing position information of said movable display means relative to said first display means; and
   computer means, coupled to said first display means and said movable display means, for storing image information for said first and second display means, said computer means supplying stored image information to said second display means in accordance with the position information provided by said position sensor of said movable display means.

2. The interactive display system as defined in claim 1, wherein said computer means also supplies image information to said second display means in accordance with information inputted by said input means.

3. The interactive display system as defined in claim 1, wherein said movable display means is movable in six different degrees of movement relative to said first display means.

4. The interactive display system as defined in claim 3, wherein said position sensor provides the position information in terms of the six different degrees of movement of said movable display means.

5. The interactive display system as defined in claim 1, wherein said movable display means is movable in first, second and third directions, said first and second directions being orthogonal to each other, and the third direction being orthogonal to the first and second directions.

6. The interactive display system as defined in claim 5, wherein said movable display means is also moveable in a yaw direction with respect to the first direction, a pitch direction with respect to the second direction, and a roll direction with respect to the third direction, and wherein said position information provided by said position sensor includes information representing said first, second, third, yaw, pitch and roll directions of said movable display means relative to said first display means.

7. The interactive display system as defined in claim 1, wherein said second display means is one of a liquid crystal display, an electroluminescent display, and a plasma display.

8. The interactive display system as defined in claim 1, wherein said first display means displays, in accordance with image information supplied from said computer, a plurality of icons, and wherein said computer means stores image information concerning each of the displayed icons.

9. The interactive display system as defined in claim 8, wherein said computer means supplies, in response to position information from said position sensor indicating that said movable display means is aimed at one of said displayed icons, first image information to said second display means, said supplied first image information representing information concerning said one displayed icon.

10. The interactive display system as defined in claim 8, wherein said computer means supplies, in response to position information from said position sensor indicating that said movable display means is aimed at the one displayed icon and that said movable display means is within a predetermined distance from said large display means, second image information to said second display means, said supplied second image information representing information concerning said one displayed icon but being different from the first image information.

11. The interactive display system as defined in claim 1, wherein said first displays means displays an image comprising a plurality of different portions, said computer means supplies, in response to position information from said position sensor indicating that said movable display means is aimed at one of the portions of the image displayed on said first display means, first image information to said second display means, said first image information representing the one image portion displayed on said first display means, and wherein said second display means displays, in response to said first image information, said one image portion at a magnification which is substantially equal to a magnification of the one image portion displayed on said first display means.

12. The interactive display system as defined in claim 11, wherein said computer means supplies, in response to position information from said position sensor indicating that said movable display means is aimed at the one image portion and that said movable display means is within a predetermined distance from said large display means, second image information to said second display means, said second image information representing the one image portion displayed on said first display means, and wherein said second display means displays said one image portion at a magnification which is substantially different from a magnification of the one image portion displayed on said first display means.

13. The interactive display system as defined in claim 1, wherein said movable display means comprises a plurality of movable display means, each of said plurality of movable display means comprising said second display means, said input means and said position sensor.

14. The interactive display system as defined in claim 1, wherein said input means comprises manually-operated controls.

15. The interactive display system as defined in claim 1, wherein said input means is operable for supplying a control signal to said computer means, and wherein said computer means supplies, in response to said control signal, a same image information to said second display means regardless of the position information from said position sensor.

16. An interactive display system for interacting with a model of a physical object, the model containing a plurality of different parts, the system comprising:
   a movable display means comprising display means, input means for inputting information, and a three-dimensional position sensor for providing three-dimensional position information of said movable display means relative to the model; and computer means, coupled to said movable display means, for storing image information for said display means, said image information representing information concerning the model, said computer means supplying, in response to position information provided by said position sensor indicating that said movable display means is aimed at the model, image information to said display means.

17. The interactive display system as defined in claim 16, wherein said computer means supplies, in response to position information from said position sensor indicating that said movable display means is aimed at one of plurality of parts of the model, first image information to said display means, said supplied first image information representing information concerning the one model part.

18. The interactive display system as defined in claim 17, wherein said computer means supplies, in response to position information from said position sensor indicating that said movable display means is aimed at the one model part and that said movable display means is within a predetermined distance from the model, second image information to said display means, said supplied second image information representing information concerning said one model part but being different from the first image information.

19. The interactive display system as defined in claim 16, wherein said input means is operable for supplying a control signal to said computer means, and wherein said computer means supplies, in response to said control signal, a same image information to said display means regardless of the position information from said position sensor.

20. An interactive display system for interacting with a physical object comprising:
a movable display means comprising display means, input means for inputting information, and a three-dimensional position sensor for providing three-dimensional position information of said movable display means relative to the object; and
computer means, coupled to said movable display means, for storing image information for said display means, said image information representing information concerning the object, said computer means supplying, in response to position information provided by said position sensor indicating that said movable display means is aimed at the object and within a predetermined distance from the object, the image information to said display means.

21. A method for displaying images in an interactive display system comprising:
a first display means;
a movable display means having a second display means which is substantially smaller than said first display means, input means for inputting information, and a position sensor for providing position information of said movable display means relative to said first display means; and computer means, coupled to said first display means and said movable display means, said method comprising the steps of:
storing, in said computer means, image information for said first and second display means, and first supplying stored image information to said second display means in response to the position information provided by said three-dimensional position sensor of said movable display means.

22. The method as defined in claim 21, wherein said step of first supplying includes the step of second supplying image information to said second display means in response to information inputted by said input means.

23. The method defined in claim 21, further including the step of second supplying to said first display image information including a plurality of icons, and wherein said step of first storing includes the step of second storing image information concerning each of the displayed icons.

24. A method of operating an interactive display system interacting with a model of a physical object, the model containing a plurality of different parts, the system comprising:
a movable display means having display means, input means for inputting information, and a three-dimensional position sensor for providing three-dimensional position information of said movable display means relative to the model; and computer means, coupled to said movable display means, the method comprising the steps of:
storing image information for said display means and first supplying, in response to position information provided by said three-dimensional position sensor indicating that said movable display means is aimed at the model, image information to said display means.

25. The method as defined in claim 24, wherein said step of first supplying includes the step of second supplying, in response to position information from said position sensor indicating that said movable display means is aimed at one of plurality of parts of the model, first image information to said display means.

26. The method as defined in claim 25, wherein said step of first supplying includes the step of third supplying, in response to position information from said position sensor indicating that said movable display means is aimed at the one model part and that said movable display means is within a predetermined distance from the model, second image information to said display means, said supplied second image information representing information different from the first image information.

27. A method of operating an interactive display system interacting with a physical object comprising a movable display means having display means, input means for inputting information, and a three-dimensional position sensor for providing three-dimensional position information of said movable display means relative to the object; and computer means, coupled to said movable display means, the method comprising the steps of:
storing, in said computer means, image information for said display means; and
supplying, in response to position information provided by said three-dimensional position sensor indicating that said movable display means is aimed at the object and within a predetermined distance from the object, the image information to said display means.

28. A method of operating a multiple display system comprising the steps of:
storing first data representative of a plurality of images,
retrieving second data from said first data representative of a first image at a first resolution displaying said first image on a first display utilizing said second data, and moving a moveable display with respect to said displayed first image, displaying a second image on said moveable display utilizing third data, detecting the movement of said moveable display, generating tracking signals indicative of the position and movement of said moveable display, generating a plurality of control signals, retrieving said third data from said first data in response to said tracking signals and said plurality of control signals and coupling said third data to said moveable display for displaying said second image.

* * * * *